United States Patent [19]

Canty

[11] Patent Number: 4,977,418
[45] Date of Patent: Dec. 11, 1990

[54] CAMERA VIEWING UNIT

[76] Inventor: Thomas M. Canty, 483 Fruitwood Terrace, Williamsville, N.Y. 14221

[21] Appl. No.: 416,705

[22] Filed: Oct. 3, 1989

[51] Int. Cl.⁵ ............................................. G03B 37/00
[52] U.S. Cl. ........................................ 354/63; 354/76; 354/81; 358/99; 358/100
[58] Field of Search ...................... 354/63, 76, 81, 293, 354/295; 358/99, 100; 73/323, 327, 328, 331; 220/82 A

[56] References Cited

U.S. PATENT DOCUMENTS

| | | | |
|---|---|---|---|
| 2,744,487 | 5/1956 | Moore et al. | 73/323 |
| 3,299,851 | 1/1967 | Olsen | 73/323 |
| 3,837,226 | 9/1974 | Kawawa | 73/331 |
| 4,245,566 | 1/1981 | Shimansky et al. | 220/82 R X |
| 4,346,404 | 8/1982 | Gantenbrink | 358/99 |
| 4,809,862 | 3/1989 | Canty | 220/82 A |

Primary Examiner—Brian W. Brown
Attorney, Agent, or Firm—James J. Ralabate

[57] ABSTRACT

A camera viewing unit for use in viewing the interior of a high pressure vessel that has a CCTV camera spring mounted within a hermetically-sealed housing. The camera can be focused from outside the housing by a structure which moves the camera horizontally while the lens remains stationary. By moving the camera toward and away from the object to be viewed, the camera can be focused by the user at a location remote from the pressurized vessel. There is also a plate connected to the camera which can be rotated to thereby align the camera to ensure that a level image is obtained.

14 Claims, 2 Drawing Sheets

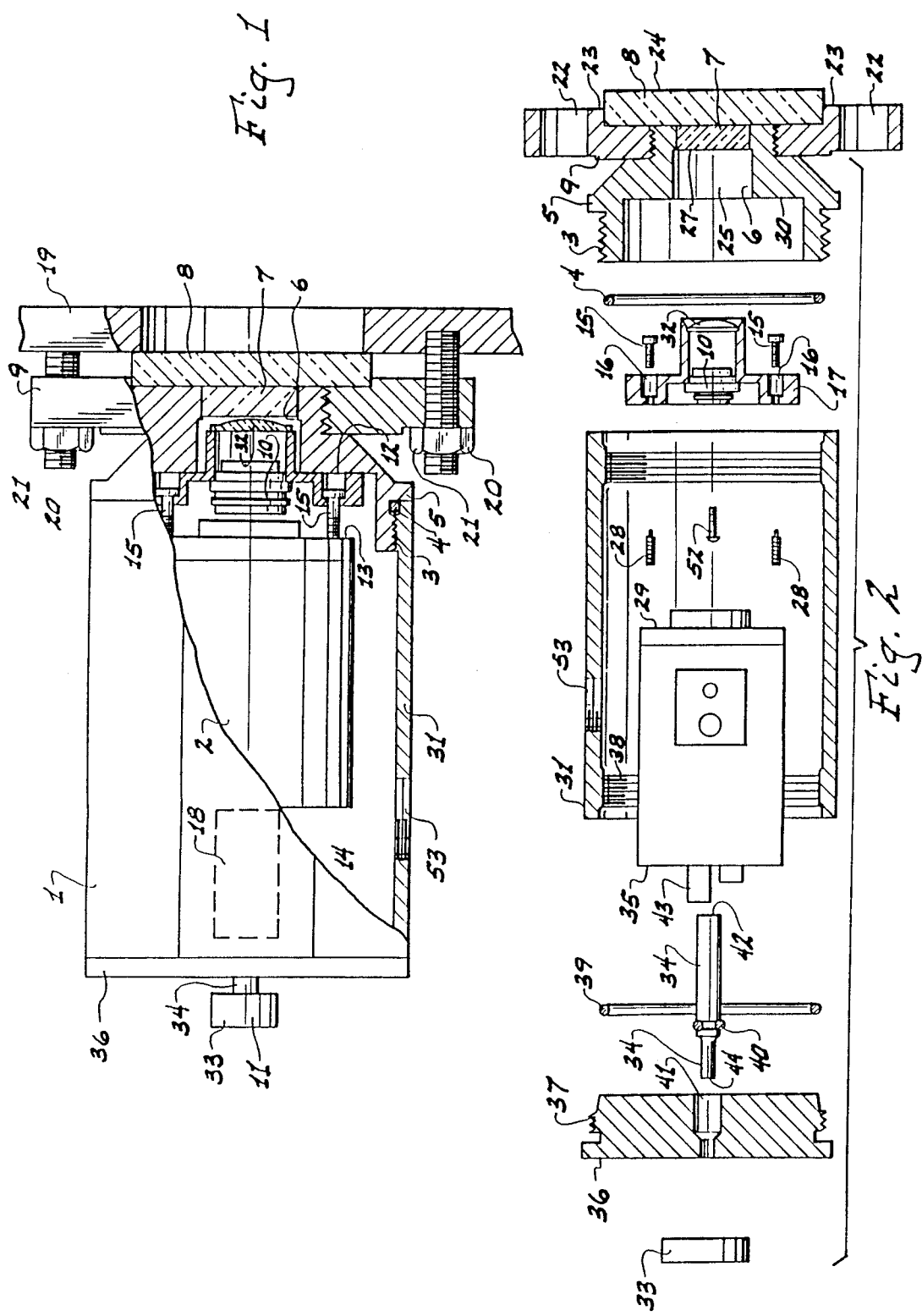

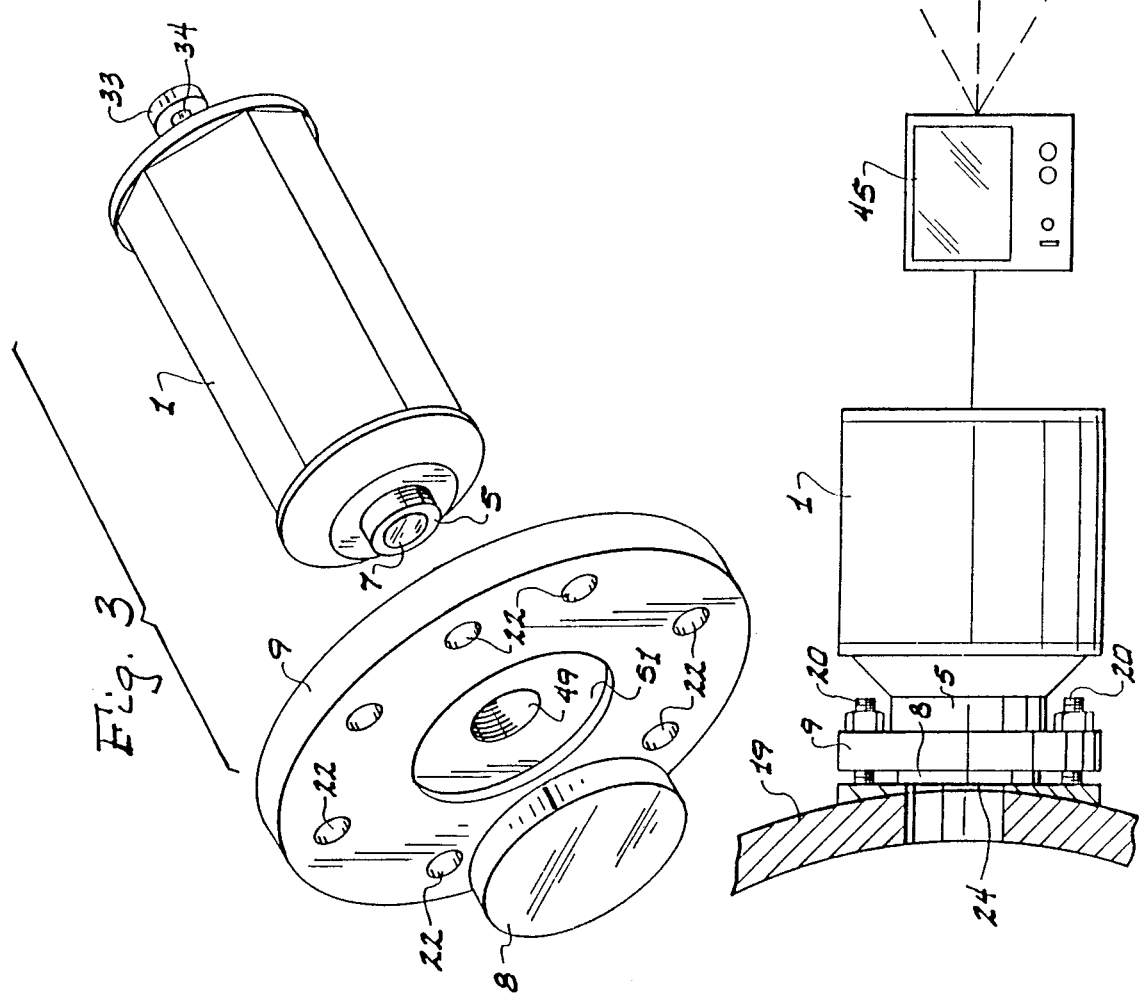

CAMERA VIEWING UNIT

This invention relates to means for visually monitoring the interior of a vessel and, more particularly, an explosion-proof camera viewing structure.

BACKGROUND OF THE INVENTION

There are known various means for viewing the interior of a process vessel during a manufacturing or reaction phase. The simplest means is to provide a viewing window located in the wall of the vessel for visual observation of the activity within the vessel. Several of these viewing windows are disclosed in U.S. Pat. Nos. 2,744,487; 3,299,851; 3,837,226 and 4,245,566. A serious drawback to the use of these viewing windows is the possibility of failure or rupturing of these windows when used in a high pressure or high temperature system. Personnel using or in the vicinity of these window could be seriously injured if the windows fail to withstand the internal pressure generated within the reaction vessel. To correct this drawback, a safety glass viewing window was provided in U.S. Pat. No. 4,809,862 (Canty). Canty provided a novel safety viewing window that was substantially safer and more structurally sound for use in a high pressure-high temperature vessel.

To extend the safety of these type devices a viewing of the interior of high pressure process vessels through a remote location at a safe distance from the vessel is highly desirable. There are situations where explosion potential exists during the use of these vessels and optimum safety can be afforded by removing personnel from the area of the vessel location. At the same time window viewing of the interior activity of a reaction (or other) vessel can only provide instant viewing information. For example, if it was desired to play back a foaming operation or reaction process to determine color changes, reaction levels or densities or other relevant factors, instant viewing through a window would not provide such an opportunity. It is highly desirable to provide a system for viewing the interior of such vessels at a remote location by the use of a viewing camera that can not only provide instant viewing but can also allow recording of data for later study or by the use of appropriate computer programs and digital information fully analyze the activity taking place or that earlier took place. A camera viewing could afford substantial advantages in addition to safety than are presently provided by viewing windows for direct personal viewing. There have been some attempts in both (A) standard viewing (not high temperature or high pressure vessels) and (B) hazardous area viewing to utilize cameras for this purpose.

(A) In standard viewing in a high pressure/high temperature system, users have been limited to makeshift methods. Generally, to view the interior of a vessel at a remote location, the user would have to mount a CCD or CCTV Camera onto an existing sightglass window. Any suitable camera may be used. They would then encounter some or all of the following problems that would render the system ineffective:
  (1) The sightglass and CCD lens would become dirty due to dirt external to the vessel.
  (2) The process fluid or vapors would leak out or flow out due to a sightglass breaking or leaking. This would then destroy the electronics making the system worthless.
  (3) Reflection from room lighting would cause the vessel view to disappear.

(B) Hazardous area viewing to date in industry has been performed by using a nitrogen-purged housing. The nitrogen purge is provided to eliminate and dilute hazardous vapors and prevent them from exploding. The nitrogen-purged housing is made of thin gauge metal with a window that the CCD Camera sees through. The limiting factors in the design are:
  (1) Purging is a continuous cost of operation.
  (2) Instrumenting the purge gas and piping the purge gas is very expensive and limits the locations where the camera can be mounted.
  (3) The gasketed window that the CCD Camera looks through is fragile and subject to breakage. Not only is there maintenance and replacement cost but there is also a major safety hazard created if the purge controls do not operate properly.
  (4) Hazardous area viewing of a high pressure area has not been attempted due to the combination of problems from 1, 2 and 3 above. One would currently have to use a purge camera housing on a sightglass and suffer from all of the problems mentioned above.

The structures of a camera device on a reaction vessel could easily become corroded and could fail. Uneven glass loading due to uneven bolt or gasket stresses can cause cracking and leakage. Also, corrosive chemicals during extended usage could cause failure of these mounting structures or failure of the camera being used. The camera systems of the prior art are cumbersome, oversized and in many instances tend to reflect light and cause image distortion. In addition, focusing and manipulating of the camera to provide optimum usage has been difficult when using prior art devices. Therefore, while some degree of improvement is provided by camera viewing heretofore used, none of these systems provide an adequate system for reliable and extended usage.

SUMMARY OF THE INVENTION

It is therefore an object of this invention to provide a safety camera viewing device which is devoid of the above-noted disadvantages.

Another object of this invention is to provide a viewing system for vessels where the operator can monitor at a remote and safe location.

A further object of this invention is to provide a viewing system for the interior of high pressure vessels where several criteria relating to the contents can be determined, controlled and monitored.

A still further object of this invention is to provide a camera viewing system that can be easily focused and adjusted after installed in a vessel.

Another still further object of this invention is to provide a camera viewing system where visual observations can be recorded, digitized and analyzed during or after viewing.

A yet still further object of this invention is to provide a camera viewing system for viewing the interior of a vessel that will be resistant to corrosion, cracking, vapor or liquid leakage and deterioration upon extended usage.

Still yet another object of this invention is to provide a camera viewing system that is relatively easy to use and will allow a precise and non-distorted view of a vessel interior and its contents.

A further object is to provide a camera viewing system for use in vessels such as chemical reactors, fermenting chambers, foaming vessels, agitation or mixing vessels and the like.

Another further object is to provide a camera viewing and monitoring means helpful in determining content particle size, fluid density and other essential criteria of materials in a pressure vessel.

The foregoing objects and others are accomplished in accordance with this invention by providing a camera viewing means that is fixed in place and yet can be adjusted according to the precise object to be viewed. The camera viewing means of this invention can be used in high pressure vessel systems to view the interior with a minimum of risk from a safety standpoint. It can also be used in standard viewing of non-pressurized vessel interiors such as in baking mixing vessels and the like. Its main use, however, would be with high pressure/high temperature systems where viewing windows and their use would present a possible danger to the user-observer. Such high pressure vessels are used, for example, as chemical reactors, pharmaceutical fermenting chambers or vessels, chemical foaming vessels, power steam boilers, autoclaves, pressure chambers and the like. In these high pressure vessels it is not uncommon for viewing windows to become corroded or weakened during extended usage and eventually blow off the containing vessel thereby presenting a real danger to the operator. Yet it is important to view the interior to determine among other things stages of chemical reactions, phases of fermenting processes, particle sizes in grinding operations, appropriate agitation in chemical mixing vessels, fluid densities in chemical or liquid reactors, etc.

Generally, the viewing structure of an embodiment of this invention comprises a hermetically-sealed housing which is explosion-proof into which a CCD Camera is mounted. The CCD Camera is an acronym for Charged Coupled Device which has been chosen for the present invention. The CCD imaging device is used instead of a vidicon tube. A typical CCD Camera useful in this invention is a Sony Camera having a Sony Model No XC-711. At the front end of this housing is positioned mounting means to attach the housing to a vessel whose interior portion is to be viewed. A window or lens is provided at this front end portion through which the camera will view the interior of the vessel. This lens is a fused high pressure lens where the glass is fused to the metal housing. The lens can be made from any suitable material such as inorganic glasses, acrylics, other polymeric materials, boron glass or other suitable, optically-clear materials. The housing can be constructed of aluminum, other metals or synthetic materials that have the necessary strength. Aluminum housings are preferred because of cost, weight and corrosion resistance factors. The lens can be fused to the housing by a process similar to that process described in *Glass Engineering Handbook Third Edition*, Chapter 5, 1984 Library of Congress No. ISBN 0-07044823-X by G. W. Mclellan and E. B. Shand. The CCD Camera is mounted in the housing with its lens facing the fused housing lens through which the camera will view the interior of a vessel. The fused lens in the housing will permit viewing the interior of the vessel through an aperture in the vessel side through a threaded or flange connection. The front fused lens can be laminated to make all welded parts of glass as described in U.S. Pat. No. 4,809,862. The camera will be spring mounted in its front portion on slide bearings in the housing. This is to permit focusing of the camera by moving it backward or forward in the housing. Focusing of the CCD Camera can be accomplished by externally adjusting a turn screw threaded into and through the rear of the housing so that it contacts the rear portion of the camera and pushes it forward or allows it to move backward when loosened since it is spring mounted. A servo motor may be used in place of or together with the adjusting or focusing screw, if desired. After the housing containing the camera is attached to a vessel wall a front alignment plate is used to adjust the position of the camera to be sure that the picture generated will be level. The terms "level" or "level position" mean throughout this disclosure and claims positioning the longitudinal axis of the camera on a plane parallel with the ground or some other 180 degree surface. In a hand-held camera, for example, if the camera is slanted while picture taking, the resulting photo will be slanted accordingly. The front alignment plate permits adjusting the camera position once the housing is in place on the vessel wall.

By providing the camera viewing system of the present invention the following advances over the art and advantages are accomplished:

(a) Fused glass to metal sealed front plano-plano lens. Hermetically sealed does not allow any vapors to enter.

(b) O-ring sealed fuseview lens holder to metal (or plastic) house. Along with a rear O-ring threaded seal cap provides the strength and integrity needed to prevent an internal explosion from breaking the housing apart and the threading keeps the flames from propagating out, thereby making unit explosion-proof without purging. The O-ring sealed housing makes it also Nema 4 weatherproof. The fuseview (fused glass to metal sealed lens) will withstand the internal explosion along with maintaining a hermetic, gasketless seal. An O-ring is a self-energizing seal (meaning no torque or force is required to "seat" the O-ring) that has a circular cross section and is made of an elastomeric material (an elastomer material is one that can be compressed and then released and after it is released it will return to its original shape). The O-ring groove used in this invention is a standard design. Nema 4 is an area classification for electrical enclosures. A Nema 4 enclosure is suitable for outdoor use and areas where it may be washed down with water. Nema is a standard electric code that has numerals to designate set electrical standards.

(c) Focusing of the vision system CCD Camera or other style imaging device can be performed external to the housing through the rear focusing screw. This threaded focusing screw pushes continually on the camera since the camera is spring mounted in the front on slide bearings. This concept is unique since most cameras are focused by moving the lens package back and forth. In the present invention it is extremely important to maintain the lens distance as close to the front fused lens as possible in order to maximize the viewing angle. If the lens retracts the view angle retracts and has a potential to interfere with the wall of the fuseview (or pressure vessel wall). This eliminates the need to open the housing of the present invention which could cause an accident, explosion or allow vapors to attack the unit.

(d) The spring-loaded bearing mount CCD Camera allows a servo motor, drive motor, hydraulic operator or air operation to move the lens the required distance for focusing remotely instead of using the focusing screw.

(e) The front alignment plate carries the slide bearing mount. It also serves as a mounting plate for the lens cartridge on the explosion-proof camera. This plate is mounted by two screws in slotted holes. By loosening the screws the CCD Camera (or any other imaging device) can be rotated relative to the view object. This creates the proper image orientation on the monitoring screen. This plate also keeps the lens assembly at the optimum fixed position.

(f) A telephoto lens that is manually or electrically driven external to the housing and can be used keeping the integrity of the housing intact. One can attach the center focusing lens to the CCD while fixing the remaining lens to the alignment plate or fused lens assembly. To focus a telephoto lens a center (lens located in the middle) needs to be moved relative to the lens assembly infront and the lens assembly behind. In a standard design it is easy to accomplish this. Anyone using this system can adjust the lens by rotating the body. In the present invention, the adjusting lens is fixed to the camera body. This moves this lens with the camera and keeps the other stationary. A bracket spanning the camera can be used if zoom lens is used once it is focused.

BRIEF DESCRIPTION OF THE DRAWING

FIG. 1 is a side plan view of the camera viewing unit of this invention with a wall breakaway portion to illustrate the camera mounted therein.

FIG. 2 is an exploded view of the components in the camera viewing unit of this invention.

FIG. 3 is a side perspective view of the viewing unit of this invention illustrating the fused lens and laminated lens overcoating.

FIG. 4 is a schematic view of the system wherein the camera viewer of the present invention is used.

FIG. 5 is a rear plan view of the rotating alignment means or leveling means used to level the camera of this invention.

DETAILED DESCRIPTION OF THE DRAWING AND THE PREFERRED EMBODIMENT

In FIG. 1 a weatherproof and explosion-proof housing 1 is shown with a partial breakaway portion to illustrate the position of camera 2 therein. The housing 1 is preferably made of aluminum but any other suitable material may be used. The front end of housing 1 has a threaded opening 3 from which camera 2 may be inserted into the interior of housing 1. Threaded opening 3 has an O-ring seal 4 or other suitable seal means to ensure that housing 1 is hermetically sealed. A complementary threaded front component 5 is screwed into threaded opening 3 to tightly enclose camera 2 within housing 1. Threaded front component 5 comprises an aperture 6 therethrough which is covered by a fused lens 7 that can be strengthened by an optional laminated overcoating 8 which is positioned on the outermost front end of front component 5. Fused lens 7 is preferably made of soda lime and is fused on the metal surface of front component 5 by the process above earlier described in *Glass Engineering Handbook*. The preferred laminated overcoating 8 is laminated over the front portion of lens 7. In the laminating process the fused lens of this invention is bonded to a glass or plastic or other optically clear material by a clear epoxy. The lamination holds the glass facing in place and provides an optical connection that reduces optical distortion. Also, it further protects against corrosion due to harsh chemicals used in the vessel. Both lens 7 and overcoating 8 must be suitable optically clear materials. Suitable laminate materials are soda lime, pyrex, mica, quartz and Teflon. The laminated overcoating 8 over fused lens 7 provides maximum strength and safety to the structure. The outer front surface of overcoating 8 is in contact with the interior of a vessel and will be subjected to various chemicals, corrosive agents, high pressures and the like and must be able to withstand all of these. The outermost portion of front component 5 is attached to the vessel (to be viewed) by a flange mounting 9 or a threaded mounting or a tri-clamp or any other means. Bolts extending through a plurality of locations around flange mounting 9 will securely hold the viewing structure and housing 1 to the side of a vessel. Fused lens 7 is overcoated with laminate 8 on its outer face and abuts camera fixed lens 10 and 32 on its inner face. In focusing camera 2 for a clear visual image, fixed camera lens 10 and 32 remains fixed but camera 2 is moved by external focusing screw 11. Camera 2 is mounted at its front end on springs (shown on FIG. 2) which are supported on the inside surface 13 of camera 2. The springs push against surface 12 on component 17 and permit camera 2 to be moved forward and backward horizontally when pressure is exerted on the back end 14 of camera 2 by focusing screw 11. The camera 2 is secured to front component by a shoulder bolt 15 located above and below fixed lens 10 and 32. Fixed lens 10 is toward the rear and fixed lens portion 32 is closer to the front of the structure. A space in front of alignment plate 17 allows shoulder bolt 15 to slide on bearing mount 16. This is done for re-orienting or leveling the camera once the housing 1 and camera 2 are attached to a vessel. Adjustment plate 17 is held down by bolts 52 which mount in slotted grooves in adjustment plate 17 as is shown in FIG. 5. This alignment or adjustment plate 17 ensures that the picture transmitted is level by leveling the position of the camera 2. Once it is moved to a level position, camera 2 is locked in place by tightening two bolts in a slotted groove as shown in FIG. 5. Slide bearing mounts 16 are positioned in front alignment plate 17 at locations in said alignment plate 17 above and below fixed lens 10 and 32. Alignment plate 17 is a circular plate having slots 16 therein through which shoulder bolts 15 fit and move. As focusing screw 11 is adjusted, shoulder bolts 15 are moved forward or backward along the space provided in slide bearing mounts 16. A servo motor 18 may be used in lieu of or together with focusing screw 11 to move the camera 2 forward or backward in housing 1 during the focusing procedure. The servo motor 18 would permit the operator-viewer to move the camera at a remote location away from the reaction vessel or other vessel being viewed. The entire unit is attached by flange mounting 9 to a vessel wall 19. Conventional bolts 20 and nuts 21 may be used as the vessel securing means. An opening 53 is provided in the wall 31 of housing 1 through which an electrical cord or means is extended to a source of power such as electricity or a battery or the like. This power source permits the source of electrical energy for transmission of the composite video by coaxel cable or fiber optics and for all other manipulations of the camera 2.

In FIG. 2 an exploded view of the components of the camera viewing structure of this invention is shown. The front component 5 is made up of a laminate overcoating 8 overlying the front outer surface of front component 5. Above, below and around said laminate are apertures 22 through which bolts 20 extend when connecting the entire viewing unit to the side of a vessel 19. Apertures 22 are positioned in flange mounting 9. The outer face or surface 24 of laminate 8 will be in direct contact with the interior of vessel 19 when installed. On the inner face or surface of laminate 8 is fused lens 7. Laminate 8 overcoats both fuseview lens 7 and a portion of the outer surface 23 of front component 5 which surrounds and is adjacent to fused lens 7. Aperture 6 in front component 5 is completely closed by optically clear fused lens 7 and provides thereby behind fused lens 7 a compartment 25 into which the camera fixed lens 10 and 32 will fit when installed in vessel 19. Compartment 25 can be lengthened up to two feet or longer to allow fused lens 7 to penetrate into the process past a nozzle or valve. On the rear section of front component 5 is a threaded opening-connection means 3 which screws onto housing 1 in an airtight manner. A housing threaded portion 26 is provided in the front end of housing 1 to mate, receive and hermetically seal with threaded connection means 3. An O-ring seal gasket 4 is provided to fit at the top of teeth of threaded portions 3 and 26 to ensure an airtight seal, see FIG. 1 for location of O-ring gasket 4 when unit is assembled and attached to vessel 19. O-ring gasket 4 has the appearance of a thick rubber band having a round body configuration. The fixed lens 10 and 32 fits into compartment 25 when the unit is assembled and abuts the rear surface 27 of fused lens 7. Since both fused lens 7 and laminate 8 are optically clear, camera fixed lens 10 and 32 can see directly into the interior of a vessel to be viewed. Plunger springs 28 are threaded into the front surface 29 of camera 2 and on their opposite end pushing onto surface 30 of front component 5. As earlier stated, the presence of these plunger springs 28 permit camera 2 to be moved horizontally along the length of housing 1 to properly focus camera 2 when installed on vessel 19. A front alignment plate 17 is provided to permit the camera 2 to be rotatably adjusted after installation and to ensure that the camera 2 is held or positioned level in housing 1. Alignment plate 17 is a circular plate having slots 54 therethrough to permit mounting bolts 52 movement therein (see FIG. 5). Slide bearing 15 is also attached to camera face 29. This alignment of camera 2 is important since the camera 2 after installation may not be level in housing 1 relative to normal viewing and can be leveled external to the process by viewing the picture being transmitted and then rotating alignment plate 17 and camera 2 until the transmitted picture is level. It is important and critical to the present invention that the camera 2 be capable of focusing movement forward and backward on a horizontal plane and capable of rotatable movement along a horizontal axis for leveling the camera 2 to ensure a level photo or picture is transmitted and viewed. The leveling procedure described in FIG. 5 only needs to be performed on initial set up. Fixed camera lens 10 and 32 views through fused lens 7 and laminate 8 the interior of a vessel 19 (in FIG. 1). So that it is always in proper focus an external focusing screw 11 (and/or servo motor 18) is used to adjust the location of camera 2 along a horizontal plane relative to the length of housing 1. Focusing screw 11 comprises a turn knob 33 attached to push or turn rod 34. As turn knob 33 is rotated clockwise push rod moves forward (toward camera rear face 35) contacts and pushes camera 2 closer to fixed lens 10. As turn knob 33 is rotated counterclockwise it moves camera 2 away from fixed lens 10 and 32 toward back cap 36. This narrows the depth of field and allows close up objects to be viewed. Back cap 36 has a threaded face 37 which tightly screws into housing threaded face 38. An O-ring gasket 39 is locked between the threads of faces 37 and 38 to ensure an airtight closure. An O-ring gasket 40 is used around turn rod 34 to ensure a hermetical seal with back cap cavity 41 while permitting rotation of turn rod 34 therein. Turn rod 34 extends through back cap cavity 41 and is fixed to turn knob 33 at a point outside of housing 1. Turn rod terminal end 42 contacts camera surface 35 and rests therein to provide the camera connection which moves the camera forward or backward when turn knob 33 and turn rod 34 are rotated. Outer terminal end 44 of turn rod 34 is connected to turn knob 33 to provide the connection between the turn knob 33 and fixed camera surface 35.

In FIG. 3 an exploded side perspective view of the exterior of the viewing unit of this invention is illustrated. Housing 1 is shown having threaded front component 5 which screws into a threaded aperture 49 in flange mounting 9. Flange mounting 9 has a plurality of flange apertures 22 through which bolts 20 fit when attaching the camera viewing unit to vessel 19. Fused window 7 as shown is fused on the metal surface of front component 5. After flange mounting 9 is connected onto the front component 5 the outer surface of fused window 7 will abut the inner surface of laminate overcoating 8. Laminate 8 is fit into flange depression 51 and permanently fixed therein. Laminate 8 is then in direct contact with the interior of vessel 19 and protects fused lens 7 from degradation due to offensive or corroding chemicals or other contents in vessel 19. As noted earlier, both laminate 8 and fused lens 7 must be optically clear to provide clear viewing of the vessel 19 interior. Focusing screw 11 is shown in the rear portion of housing 1 for external adjustment of the camera 2 which is moved internally of housing 1.

FIG. 4 is a schematic view of a system where the camera unit of this invention can be used. Here a vessel 19 to be viewed has attached thereto a camera viewing unit of this invention. Laminate 8 is in direct contact with the interior of vessel 19 as shown. Front component 5 is attached to the wall of vessel 19 by by bolts 20 as described in FIG. 2 or by a threaded connection means which would screw into the side of vessel 19. The unit is electrically connected to a source of electrical energy and to a monitor 45 for remote viewing. From the view projected in monitor 45, level controllers 46, digitizing means, recording means 47, data indicator 48 and the like can be manipulated to provide the necessary control and information on the contents in vessel 19. For example, by determining the change in light intensity, particle size can be determined or liquid level controlled, etc.

In FIG. 5 a back view from the rear of the camera viewing unit is shown with back cap 36 and body 31 removed. In FIG. 5 in order to level the camera's view, the operator loosens mounting bolts 52 after back cap 36 has been removed from housing 1. Once mounting bolts 52 are loosened, the camera 2 which is secured to alignment plate 17 can be rotated via bolts 52 in grooves 54 clockwise or counterclockwise in order to level the view. Once the proper orientation of view is achieved, mounting bolts 52 are retightened to thereby fix the camera in a horizontal position.

The camera viewing unit of this invention provides an efficient means for viewing the inside of a pressure vessel or process area. This area as earlier stated can be a pressurized autoclave, radiation, temperature explosion-proof area. The viewing unit of this invention brings the viewer inside the area while maintaining all equipment outside the area. The monitor 45 can be at the vessel or remote to the process allowing remote monitoring where the process is controlled. The viewing unit of this invention can be mounted on the vessel by a mounting flange with bolts, by a threaded section which screws into the vessel or by any other suitable means. It is critical to the invention that the camera 2 mounted within housing 1 have horizontal movement both toward and away from fused lens 7, and that camera 2 can be realigned or moved rotatably to ensure a level picture is transmitted.

The preferred and optimumly preferred embodiments of the present invention have been described herein and shown in the accompanying drawing to illustrate the underlying principles of the invention but it is to be understood that numerous modifications and ramifications may be made without departing from the spirit and scope of this invention.

What is claimed is:

1. A camera viewing unit adapted to be connected to a vessel comprising a camera, a hermetically-sealed camera housing, a camera adjusting means and a camera focusing means, said camera housing containing internally therein said camera and having a front opening means permitting said camera to view out of an opening in a front viewing portion of said housing, a fixed lens mounted between a lens of said camera and the front viewing portion of said housing, said front opening in the viewing portion of said housing comprising an aperture having fused thereover a fused lens, said fused lens being optically clear and fused to said front viewing portion around said aperture, said camera adjusting means and said camera focusing means being located external of said housing.

2. The camera viewing unit of claim 1 wherein said camera focusing means comprises means to move said camera horizontally internal of said housing.

3. The camera viewing unit of claim 1 wherein said camera adjusting means comprises means to move said camera to a level position to provide thereby a level image to a viewer.

4. The camera viewing unit of claim 1 wherein said unit comprises vessel connecting means for attachment to a vessel.

5. The camera viewing unit of claim 1 wherein said unit comprises vessel connecting means having a front component with apertures therein to receive bolts for attachment to said vessel.

6. The camera viewing unit of claim 1 wherein said unit comprises vessel connecting means having a front component having a threaded extension for screwing into a threaded aperture in said vessel.

7. The camera viewing unit of claim 1 wherein said camera is spring mounted within said housing, the spring mounting providing means for horizontal movement of said camera within said housing.

8. The camera viewing unit of claim 1 wherein said camera focusing means comprises a turn knob means extending from a rear portion of said camera to a point external of said housing.

9. The camera viewing unit of claim 1 wherein said camera adjusting means comprises a servo motor.

10. The camera viewing unit of claim 1 wherein said housing has a threaded aperture through which is threaded an electrical connection means.

11. The camera viewing unit of claim 1 wherein said fused lens and a laminate overcoated thereon are optically clear and in optical alignment with a lens of said camera.

12. The camera viewing unit of claim 1 wherein said camera adjusting means comprises a circular plate connected to said camera, said plate having means to be rotated around a horizontal axis thereby aligning said camera when said plate is rotated.

13. A camera viewing unit comprising in combination a CCTV Camera, a hermetically sealed camera housing, a vessel connecting means, a camera adjusting means and a camera focusing means, said camera movably mounted within said housing and being in visual alignment with a front opening in said housing, a fixed lens positioned between a lens of said camera and said front opening in said housing, said front opening in said housing having a fused lens completely covering said opening, said fused lens having a laminated overcoating on its outer surface, said laminated overcoating located on said camera viewing unit so that it will be in direct contact with an interior of a vessel on which it will be installed, said camera adjusting means being external and in adjustable connection to said camera, said vessel connecting means having securing means for connection to a side of a vessel to be viewed.

14. The camera viewing unit of claim 13 wherein said camera focusing means comprises means to move said camera horizontally internal of said housing.

* * * * *